US007187950B2

(12) United States Patent
Hintermeier et al.

(10) Patent No.: US 7,187,950 B2
(45) Date of Patent: Mar. 6, 2007

(54) COMMAND STATION FOR MOBILE RADIO NETWORKS

(75) Inventors: Gary P. Hintermeier, Amherst, NY (US); Eric E. Buchbinder, Clarence, NY (US); Danielle M. K. Buchbinder, Clarence, NY (US)

(73) Assignee: Intel Corporation, Santa Clara, CA (US)

( * ) Notice: Subject to any disclaimer, the term of this patent is extended or adjusted under 35 U.S.C. 154(b) by 433 days.

(21) Appl. No.: 10/714,291

(22) Filed: Nov. 14, 2003

(65) Prior Publication Data

US 2005/0107077 A1  May 19, 2005

(51) Int. Cl.
*H04B 1/38* (2006.01)
*H04M 1/00* (2006.01)
*H04M 3/00* (2006.01)
(52) U.S. Cl. .................. 455/565; 455/419; 455/420
(58) Field of Classification Search ........... 455/565, 455/418–420
See application file for complete search history.

(56) References Cited

U.S. PATENT DOCUMENTS

| | | | | | |
|---|---|---|---|---|---|
| 5,991,614 A | * | 11/1999 | Oura | .................. | 455/404.1 |
| 6,085,096 A | * | 7/2000 | Nakamura | ............... | 455/456.6 |
| 6,108,563 A | * | 8/2000 | Shishino | ................. | 455/560 |
| 6,448,906 B1 | * | 9/2002 | Nachtsheim et al. | ........ | 340/945 |
| 6,597,895 B1 | * | 7/2003 | Maeda | .................. | 455/88 |
| 6,718,175 B1 | * | 4/2004 | Edstam | .................. | 455/456.5 |
| 6,961,579 B2 | * | 11/2005 | Inukai et al. | ............ | 455/456.4 |
| 2002/0119788 A1 | * | 8/2002 | Parupudi et al. | ............ | 455/456 |

* cited by examiner

*Primary Examiner*—Duc M. Nguyen
(74) *Attorney, Agent, or Firm*—Blakely, Sokoloff, Taylor & Zafman LLP (57) ABSTRACT

In one embodiment, a control station detects the presence of a portable radio device within range of a radio frequency communications link, and sends a command to the portable radio device to change an internal setting of the portable radio device. In another embodiment, a control station receives at least one message from a portable radio device on an out of band channel, the at least one message indicating an identification of the portable radio device, a request to make an external connection, and an identification of an external device to which the portable radio device wishes to connect. The control station then establishes a connection to the identified external device, and couples the portable radio device to the established connection using an out of band channel.

92 Claims, 4 Drawing Sheets

*FIG. 7*

COMMAND STATION FOR MOBILE RADIO NETWORKS

BACKGROUND

The present invention relates to the field of radio telephony and, in particular, to a short range radio station that can send commands to, and receive commands from, nearby mobile units and provide a link to the public switched telephone network the Internet and other networks.

Portable radio telephones and messaging equipment, such as cellular telephones, radio telephones, handyphones, pagers, radio-enabled personal digital assistants, and wireless networked computers present distractions and risks in some environments. For example, electronic devices may present a risk to safe travel on commercial airlines during take-off and landing. Electronic devices may present a risk or source of interference for medical and emergency equipment in hospitals and medical facilities. Ringers and beepers may present a distraction to audiences in theaters and conferences.

Currently, users of portable electronic equipment are asked to turn off their equipment during take-off and landing, upon entering a hospital, etc. Users are asked to turn off audible alerts in theaters and conference rooms. This process requires someone to request the action and it requires that the user remember to comply. It is also an unreliable process. If the announcement is made using a sign, the user might not notice it. If the announcement is made by a speaker, the user might not hear it or might not be present at the time of the announcement. Even if the user sees or hears the announcement, it is inconvenient for the user to access the controls of all electronic devices and turn them off or disable the audible alerts. In addition, there is a chance that the user will fail to operate the controls properly. Despite a user's efforts, a device may remain turned on or able to ring loudly.

The consequences of failing to turn off an electronic device may be serious. A commercial airliner may experience navigation, communication or equipment malfunctions. Medical equipment may not operate correctly or diagnostic equipment may provide inaccurate results.

In addition, there are many areas where portable radio equipment can safely be operated but does not operate or does not operate well because of poor reception. A commercial airliner in flight and a passenger train in transit can be too far from radio base stations for a cellular telephone or wireless data network to operate. Even in urban areas, physical structures, such as train or subway tunnels and stations can block access to nearby radio stations or base stations. In order to allow for telephone or data communications in such environments, some airliners, trains and stations provide public pay telephone services. However, these are expensive to install and maintain. Some customers hesitate to use public communications equipment due to convenience, or concerns about cleanliness or privacy.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
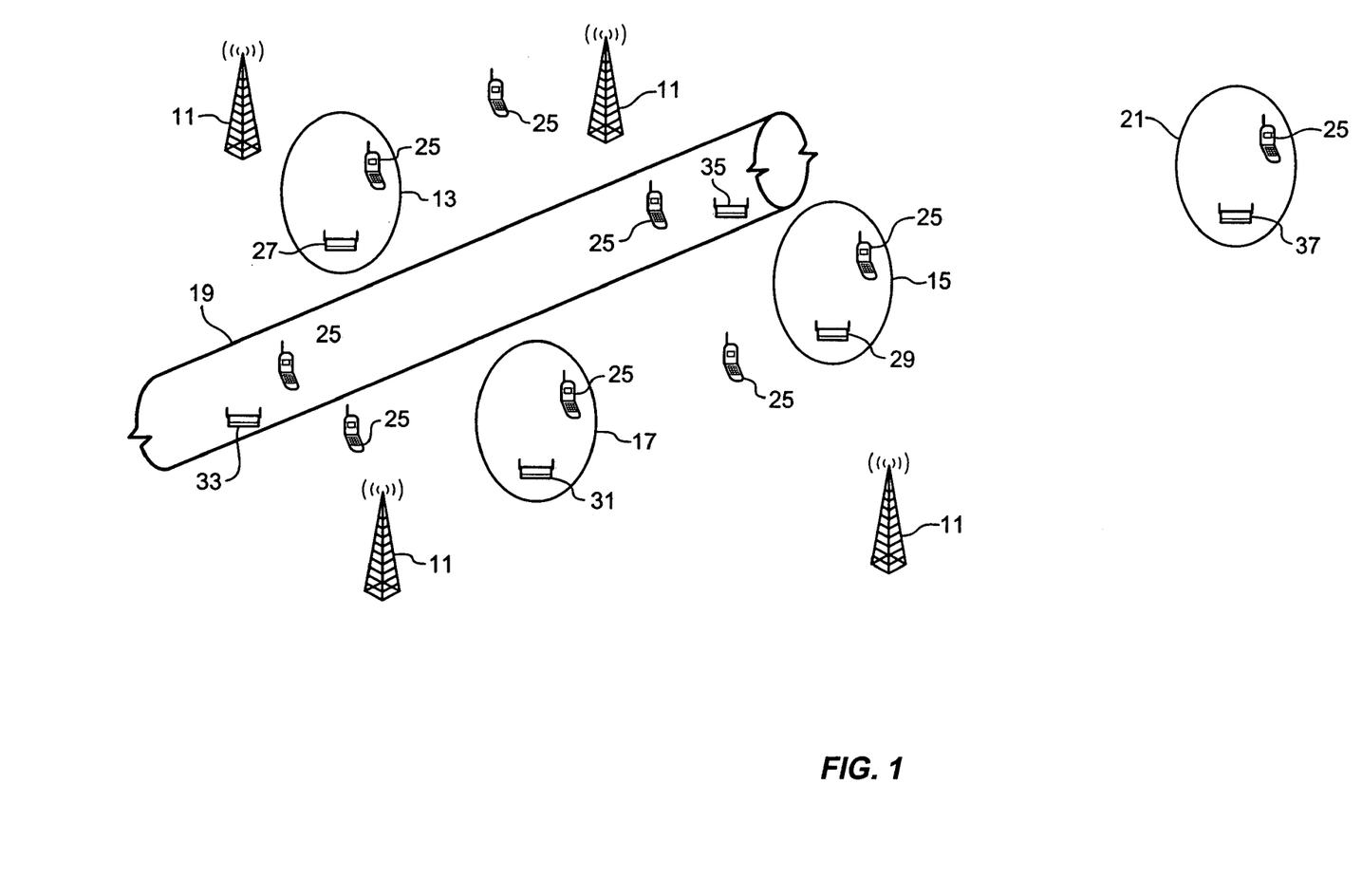
FIG. 1 is a diagram of a radio communications environment suitable for implementing an embodiment of the present invention.

FIG. 1 shows a cellular radio communications system with different regions. The system has several base stations 11 (four are shown). Each base station communicates with portable radio devices within its range. Such cellular systems are currently used for the communication of voice and data in accordance with many different standards. Such standards include GSM (Global System for Mobile Communications), GPRS (GSM Packet Radio Service), CDMA-2000 (Code Division Multiple Access), PHS (Personal Handyphone), DAMPS (Digital Advanced Mobile Phone Service), WiFi (Wireless Fidelity), and others. There are currently many more standards in use and in development as well as many private, closed standards in use. No particular wireless communications standard is necessary to the present invention. It is further not necessary that the communications system be cellular.

The cellular communication system includes many different environments. In FIG. 1, smaller regions are designated as corresponding to different facilities. The facilities include a theater 13 for recorded or live performances, a hospital or laboratory 15, an airport 17, and a subway train tunnel 19. A fifth area 21 may correspond to any type of facility that is beyond the range of any of the base stations 11. The illustrated facilities 13–21 each may have unique requirements for the use of portable radio devices. They are shown as examples only. The invention may be applied to many other types of facilities.

Each facility includes a radio commander or control station 27, 29, 31, 33, 35, 37 which will be described in more detail with respect to FIG. 2. Each facility also contains at least one portable radio device or portable station 25. The portable radio devices may roam in and out of the facilities 13–21. For discussion purposes, each facility is shown as having one portable radio device and there are three further radio devices shown as being within the cellular radio communications system but outside of any facility. Since the devices are portable and freely movable, at any one time, each facility may have none or many portable radio devices. The portable radio devices may be portable telephones, pagers, PDA's (Personal Digital Assistant), data messengers, notebook computers, web tablets, or any one or more of a variety of other portable data devices.

The radio commanders 27, 29, 31, 33, 35, 37 are short range communications devices capable of communicating with the portable radio devices 25 that come within their range. The radio commanders may use out of band channels and protocols so that their operations do not interfere with normal operations of the portable radio devices according to their assigned standards. There are several different short range communications bands and protocols that may be used, including IEEE (Institute of Electrical and Electronics Engineers) 802.11, and Bluetooth. Alternatively, an unused channel for another standard may be used. For example, in a conventional cellular telephony system, channels are reused in alternating cells. Due to the short range of the radio commander, a channel that is not used in the cell in which the radio commander is located may be used by the radio commander. As long as the amplitude of the signals is sufficiently low, interference with nearby cells may be avoided. A radio commander may be configured to scan for unused communications channels in order to determine, for example, a broadcast channel (BCH) that would capture the attention of passing cellular telephones without interfering with normal cellular telephone traffic.

The commands and messages communicated through the radio commanders may vary with the particular facility or any other aspects of the application. In one example, the facility 13 is a theater, such as a movie theater, auditorium, opera house, or play house. A radio commander 27 may be used to send a message to each portable radio device as it enters the theater asking users to turn off ringers and any other audible or distracting functions during the performance. A first radio commander may be used to ask users to turn off distracting functions as users enter the foyer, while a second radio commander may be used to actually turn off ringers or other functions as the portable radio devices enter the audience seating areas. For a large theater or auditorium, radio commanders may be used at each doorway to the theater seats. Similar principles can be applied to lecture halls, conference rooms, meeting rooms, studios, libraries, churches, restaurants, and anywhere else where quiet is desired.

In a medical facility 15, or any other facility in which sensitive electronic equipment is used, a radio commander 29 may be used to ensure that transmitters for portable radio devices 25 are turned off. The specific method applied may be adapted to suit any particular application. In one embodiment, the radio commander 29 sends a message to each portable radio device that enters the hospital instructing the user to turn off the transmitter. The message may be a text message that appears on a display of the device, a video message for the display or an audio message for the device's speaker or any combination of the above. For example, the radio commander may instruct a cellular telephone to simulate a telephone call to the cellular telephone. When the user answers, a message may be played, such as "cell phones can interfere with crucial hospital equipment; please turn off your cell phone or exit the building." If the telephone is carrying a telephone call, i.e. a circuit is active, the radio commander may command the phone to play the message over the ongoing conversation or instead of the ongoing conversation. Such a message may be accompanied by a text or video version of the message. The radio commander may also send a command to power down the transmitter with or without an initial request or warning.

In the scenario described above, among others, it may be desired to use a timing component with a command. The radio device may be instructed to execute a command at a specific time or after a specified time interval. Such a timing component may allow the user an opportunity to comply with an audio or visual message before a command is executed. It may allow a user to finish a conversation or a session before the device shuts down. It may, alternatively, delay action until the action becomes critical. For example, a cellular telephone may be instructed to power down five minutes after the user enters a hospital. This would account for the time it would take a user to walk from the door to any sensitive equipment. In this way the cellular telephone can proceed with the shut down even after it leaves the range of the command station.

As a part of this delayed command, a visible and an audible count-down to deactivation may be provided. This can be played for the user in many different ways, for example, a countdown clock or numerical display, a sequence of beeps or flashing lights with increasing frequency may be used. Alternatively, a video sequence can be played or an audio message indicating the countdown. Such a countdown can encourage the user to politely end a session or call before the radio device is deactivated.

In one application, the user may be politely requested to power off the portable radio device. In another application, the device is commanded to shut down and the user is informed. The choice of applications may be programmed into the command station or it may be offered as an option to the user. Either application can be supported by the commands transmitted to each device and received from each device.

In a transportations hub 17, such as an airport, bus station or railway station, there may be areas within or times during which portable radio devices can cause damaging interference. For example, airline passengers are typically instructed to turn off all electronic devices during take-off and landing. A radio commander 31 in the airplane or at the gate may be used to ensure that all portable radio devices are turned off when the airplane approaches the runway. The operation may be similar to that described above with respect to hospitals.

As an additional feature, a radio commander on the airplane may be used as an extension to a wireless network. Many cellular and local radio communications systems do not operate in airplanes that are in transit or they operate only sporadically. The radio commander 31 may collect identification and type information from any activated portable radio devices 25 as they enter the airplane or as they are turned on. It may then provide communications services for any devices that desire it.

In one embodiment, the radio commander uses an out of band channel for network extension. If a cellular telephone also supports Bluetooth communications, the radio commander may provide a Bluetooth based connection to telephone ground stations. For a WiFi connection, common with notebook computers, the radio commander may offer a WiFi hotspot on the airplane. This may be used to offer any or all of the services currently associated with WiFi hotspots and similar systems. The radio commander in such an implementation, in addition to the Bluetooth or WiFi interface to communicate with cellular telephones, also has an external telephone on the airplane to communicate with telephone ground stations. These may be cellular base stations for conventional cellular service, ground stations that are specifically adapted for air to ground communications or satellite antennas adapted for airplane communications.

Many airliners currently offer telephone service through seat back telephone terminals. As another alternative, the radio commander may be adapted to function as an additional terminal of the seat back telephone system. Alternatively, the seat back terminals may be removed in favor of one or more radio commander terminals. These terminals need not be mounted in the seat back, but may be located anywhere within radio reach of the radio telephones. Providing access through a user's own portable radio device benefits the user by offering familiar controls, features, and billing systems. It benefits the carrier by eliminating wear on the seat back equipment. In one embodiment, when the user powers on a portable radio device, it registers with the radio commander. The radio commander then transmits a menu of services to the user. The services may include placing a call, accessing the Internet or accessing other services unique to the airplane or the carrier. The menu, instructions and any prices may be sent to the portable radio device as text, audio or video messages.

In a subway or train tunnel 19, similar services to those described above may be offered. While it may not be desired or necessary to turn off ringers or transmitters, there may be areas in which radio services are not available or are intermittent. Cellular telephones, for example, may not be able to establish a connection with a base station on the surface. Reception may also be difficult within certain structures. FIG. 1 shows two radio commanders 33, 35 located in different locations in the tunnel. These two radio commanders may be attached to walls or fixtures within the tunnels to allow for short range communication with portable radio devices in two different locations. Alternatively, the two radio commanders 33, 35 may correspond to a single radio commander with two different antenna locations. Alternatively, the radio commanders may be located inside of two different trains traveling within the tunnel. If the radio commanders are inside a train, they may use an existing communications data network of the train system or a separate communications system on the train to communicate using antennas, power lines or tracks with terminals in the tunnels. The radio commanders may provide messaging to inform users of news and information or to provide any other desired information services. A similar approach to that described above with respect to phone use inside of hospitals may be employed.

The messaging from the radio commander may include information about stops, schedules on that or other trains, local events and news or services offered through the radio commander, among others. In addition, the radio commanders may provide a connection to a terrestrial base station or to the PSTN (Public Switched Telephone Network) through the radio commander. Connection to the Internet or other wide are networks may also be provided as described above for other facilities.

Another facility 21 shown in FIG. 1 is outside the range of the base stations 11. As a result, a portable radio device 25 cannot access its primary radio network through the base stations. A radio commander 37 may offer any one or more of the services described above, from information messages, to connections with the distant base stations 11 or the Internet to commands regarding dialing, ringing or power usage.

The facilities and services described above in each scenario are provided as examples. The particular functions or services provided by a radio commander may be adapted to suit the details of any particular application. A great amount of flexibility may be designed into a radio commander and the communication protocols to support the needs of many different applications.

Figure 2:
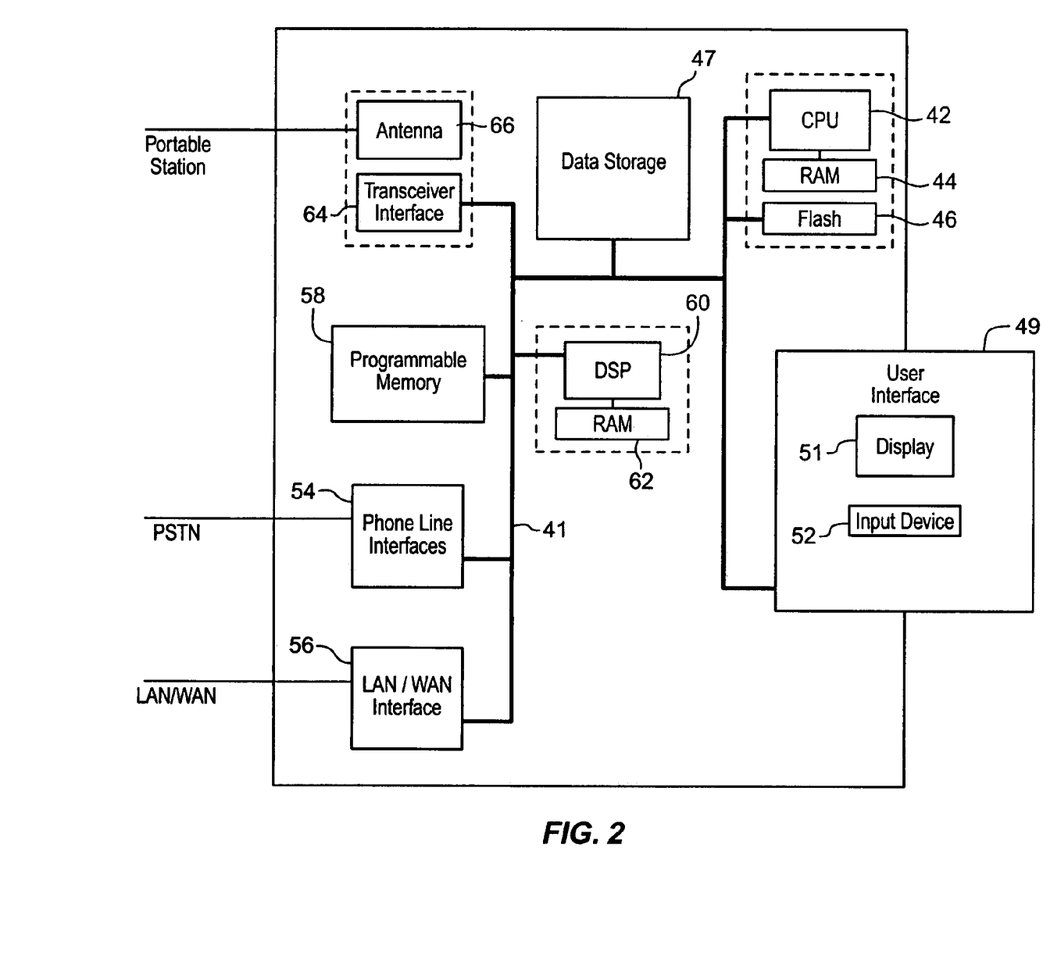
FIG. 2 is a block diagram of a command station according to an embodiment of the present invention.

FIG. 2 shows a block diagram of a radio commander according to one embodiment of the present invention. The radio commander may be implemented as a stand alone device or it may be integrated into a general purpose system such as a server, workstation, desktop, tablet, or portable machine. The radio commander includes a bus or other communication means 41 for communicating information, and a processing means such as a microprocessor 42 coupled with the bus for processing information.

The radio commander may include a main memory 44, such as a random access memory (RAM) or other dynamic data storage device, coupled to the bus for storing information and instructions to be executed by the processor. The main memory may also be used for storing temporary variables or other intermediate information during execution of instructions by the processor.

The radio commander may also include a nonvolatile flash memory 46, coupled to the bus for storing static information such as boot code and instructions for the processor. A mass memory 47 such as a magnetic disk or optical disk and its corresponding drive may also be coupled to the bus of the radio commander for storing information and instructions such as data files, profiles, audio prompts, and messages.

The radio commander may also be coupled via the bus to a user interface 49 which may include a display device or monitor 51, such as a cathode ray tube (CRT) or Liquid Crystal Display (LCD), for displaying information to an administrator. For example, graphical or text messages, status, maintenance and other data may be presented to the administrator on the display device. Typically, an alphanumeric input device 52, such as a keyboard with alphanumeric, function and other keys, may be coupled to the bus for communicating information and command selections to the processor. A cursor control input device, such as a mouse, a trackball, cursor, direction keys, or stylus pad may also be incorporated into the input device. A microphone and speakers may also be a part of the user interface.

One or more external communications interfaces may also be coupled to the bus 41. These devices include, but are not limited to a modem 54 to connect to telephone or cable lines, a network interface card 56, or other well known interface devices, such as those used for coupling to Ethernet, token ring, or other types of physical attachment for purposes of providing a communication link to support a local or wide area network (LAN or WAN), for example. The interfaces may be wired or wireless. In this manner, the radio commander may also be coupled to a number of clients, servers, and other radio commanders via a conventional network infrastructure, including an intranet or the Internet, for example.

The CPU 42 and the external interfaces 54, 56 may be used to drive the radio communications interface of the radio commander. This includes a programmable logic memory 58, such as an FPGA (field programmable gate array) or EPROM (Erasable Programmable Read-Only Memory) that contains instructions for the frequencies, protocols, and modulation formats for communicating with portable radio devices. This is coupled through the bus 41 to a DSP (digital signal processor) 60 and associated memory 62 to encode, decode, modulate and demodulate messages and signals such as audio and RF to and from any portable radio devices.

The DSP connects through the bus to a transceiver interface 64 to up-convert baseband signals from the DSP for transmission through an antenna 66. The transceiver interface also down-converts received signals to baseband and routes them to the DSP for post processing. The particular functions to be performed by the FPGA, DSP and transceiver interface will depend on the particular radio transmission system to be supported. For a Bluetooth system, after packets are assembled for transmission in baseband with the appropriate messages, the signals must be encoded, modulated, spread, and frequency hopped for transmission by the antenna. For GPRS, narrowband PSK (Phase Shift Keyed) signals are used. The FPGA, DSP and transceiver interface may be adapted to suit particular applications. In addition, due to the general purpose nature of the hardware depicted in FIG. 2, the hardware may be used to support several different communications protocols.

In one embodiment, the radio commander sends messages using several different protocols or communication standards. For example, the radio commander may attempt communication using Bluetooth, WiFi, GPRS and a cellular telephone broadcast channel, alternating among the different types of messages. This may be done to increase the likelihood of reaching all the portable radio devices that pass by. The radio commander may also attempt communication using several different protocols or standards simultaneously.

The antenna 66 may be designed to match the needs of a particular location. For example, inside a passenger airplane, the antenna may be designed with a long narrow beam to cover only the airplane interior. For a theater foyer, the antenna may be designed to match the shape of the foyer. For a hospital entry, the antenna may be designed to cover only a small area around the door. Using appropriate antenna beam forming and power control technologies, the coverage of the radio commander may be specifically directed to a particular area and interference can be minimized. Careful control of the antenna and transmit power may also allow unlicensed frequency bands to be used.

The configuration of FIG. 2 is not necessary to implement a radio commander as described herein but is provided as an example. There are a great variety of other designs capable of performing the functions described herein. A portable radio device or portable station may be implemented with a very similar architecture. For example, a notebook computer with a wireless network interface card may be configured to have a design similar to the block diagram of FIG. 2. However, other portable device configurations may also be used to implement the present invention.

It is to be appreciated that a lesser or more equipped radio commander than the example described above may be preferred for certain implementations. Therefore, the configuration of the radio commander will vary from implementation to implementation depending upon numerous factors, such as price constraints, performance requirements, technological improvements, or other circumstances. Embodiments of the invention may also be applied to other types of software-driven systems that use different hardware architectures than that shown in FIG. 2.

Figure 3:
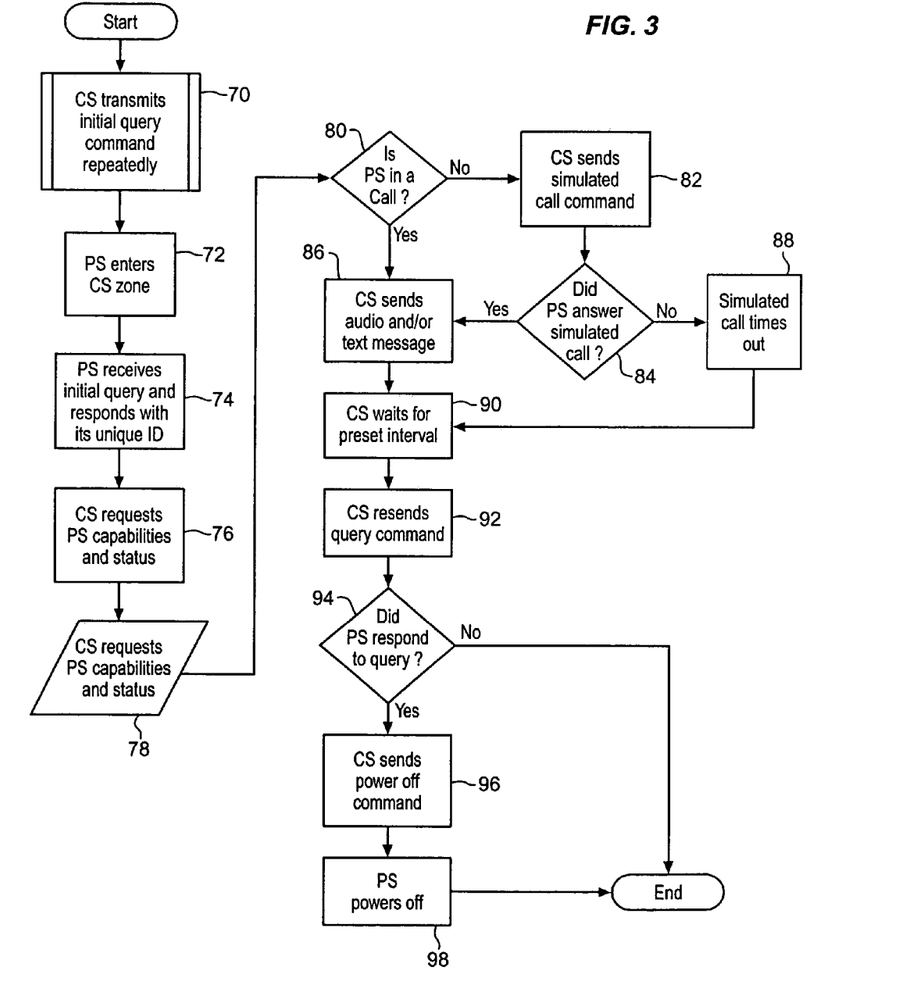
FIG. 3 is a flow chart of powering down a portable radio device according to an embodiment of the present invention.

FIG. 3 provides an example of a protocol that may be used for a radio commander to communicate with portable radio devices. The specific example of FIG. 3 is particularly appropriate for use in a hospital, laboratory, airport or other facility in which radio interference may be dangerous. However, it may also be applied or adapted to be applied to many other situations. In FIG. 3, the process starts and the radio commander, acting as a control station (CS), repeatedly transmits an initial query command at block 70. This initial query may be transmitted using one or more different communications protocols or standards. Over time, a portable station (PS) enters the range of the control station at block 72. The portable station receives the initial query at block 74 and responds with a reply message. The nature of the reply message may be adapted to suit different applications. In FIG. 3, the portable station responds with a unique identification. This may be based on a serial number, an account number or any other unique number. The unique ID may be used by the radio commander to address the PS.

The CS at block 76 requests a capabilities and status report from the PS. At block 78, the PS responds by providing capabilities and status. Alternatively, the capabilities and status may be reported in the first exchange 72, 74. The capabilities information may allow the CS to know how best to communicate with the PS. If the CS provides services, such as external connections, reports, news or information, then the capabilities information may be used to determine which services to provide and how to provide them. In the hospital scenario, the CS may wish to ask the user to turn off the PS. If the CS knows that the PS has a color video screen, then the CS may send a color video for display by the PS. If the PS has only a speaker, then the CS may send an audio file.

The status information may inform the CS whether the PS's transmitter, ringer or other features are enabled, whether it is in a call and what type of call it is in. If the PS is not in a call at block 80, then at block 82, the CS may command the PS to simulate a call. If the user answers the simulated call at block 84, then an audio file may be played for the user at block 86. The audio file may be transmitted from the CS and stored for playback at the PS, or, depending on the reported capabilities of the PS, the audio file may be transmitted by the CS in a call between the CS and the PS. Instead of storing the file it may be played in real time during the simulated call. The audio file may be a message such as "Cell phones can interfere with critical hospital equipment. Please turn off your cell phone or exit the building."

In a theater context, the same exchange between the CS and the PS may occur and the audio file may be different. An appropriate message may be "The performance will begin soon. As a courtesy to the rest of the audience, please remember to turn off your cell phone before entering the auditorium." The audio file may be accompanied by a text or video file for display on the PS display if the PS has one.

If the PS is in a call, then the same message may be sent to the PS at block 86. The message may also include a text or video file. The audio file may be superimposed over the audio for the call or it may replace the audio for the call. In this way, even a user currently in a conversation may receive the message. If the PS is a data terminal, the CS may send a command to display a message (text or video) on the PS display. This may be generated as a special dialog box or in any other way that will attract the user's attention. In one embodiment, a radio button may be included in a dialog box, so that the user is required to acknowledge the message before returning to the data communication session.

If the user is not in a call at block 80 and the user does not respond to a simulated call at block 84, then the simulated call will time out at block 88. The control station may then set a timer at block 90 and wait for some amount of time. If the user does answer the call or is in a call and receives a message at block 86, then the control station may also set a timer. After the time elapses, the control station may resend the status request at block 92. This is similar to or the same as the capabilities and status request of block 76. If the PS does not respond to the query at block 94, then the CS may log the result. The PS is probably either turned off or out of range.

A delayed execution message may improve this scenario. For example, if a PS is only briefly within range of the CS, the PS may be instructed to power down after a certain amount of warning has been provided. A delayed execution message may also be used to simplify the exchange of messages between the CS and the PS.

In some embodiments of the invention any command can be rendered abortable by the user. So, for example, with a power off command, the user may be notified that the PS will power down after some time interval. The user can then enter a key sequence to abort the power down command, so that the PS remains powered. Each command may include an indication of whether the command is abortable. For some commands, such as power down when entering a concert hall, an abortable command may be used, while for other commands, such as power down on aircraft takeoff, a nonabortable command may be used. The interpretation of an abortable command indication may vary depending upon the portable device and even depending upon device capability or subscription level. Commands for immediate and commands for delayed execution may both be made abortable.

If the PS does respond to the query at block 94, then the PS is still on and receiving messages. In a theater application, the CS may send a status request and determine whether ringers and other audible alerts have been turned off. The CS may also send another alert asking the user to turn off ringers or power down the PS. For critical situations in which radio interference from the PS may pose a significant danger, the PS may send a command to the PS to turn itself off without user action at block 96. In response, the PS will turn off its power at block 98.

A variety of different commands for turning off power may be used. In many portable radio devices, even with power turned off, there is still some portion of the device that is powered, typically a clock and a keypad polling algorithm in the processor. A command that emulates a power off action by the user may not turn off the device completely. Other variations of powering down may also be used, for example, the radio transmitter may be disabled, while the radio receiver continues to operate. Certain frequencies or higher powered modes of the transmitter may be disabled. The radio portion of a device may be disabled by command while other portions of the device continue to operate. This may allow a portable computer to perform wired and internal operations even while radio communications are disabled. The ringer and audible alerts may be disabled by command instead of by powering down the device.

In addition to sending commands powering down or disabling different features, the CS may send a time for the command. For example, if a concert is scheduled to end at 10:00 o'clock, and the CS sends a command to disable audible alerts, it may also send a message to enable audible alerts at 10:00. This message may be incorporated into the original message, sent immediately after the original message, sent at 10:00, or sent after the actual ending of the concert.

Figure 4:
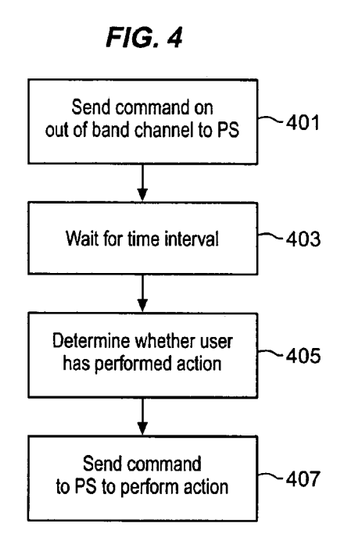
FIG. 4 shows a process for issuing commands to portable radio devices according to one embodiment of the invention.

FIG. 4 shows a process for issuing commands according to an embodiment of the invention. In FIG. 4, the CS sends a command on an out of band channel to a PS at block 401. The command may be sent in a small or a large area. The command may be any one or more of the following: a text message, an audio message, a video message, power down, ringer off, and ringer volume adjust. Other commands may also or alternatively be sent depending on the particular application. The message can be received by the PS on the out of band channel regardless of the availability or use of in-band channels.

The action at block 401 can be performed separate and apart from any other actions. It can also be combined with other actions. For example, the CS may first broadcast a low power query command in a small area on the out of band channel, and receive a message from a PS on the out of band channel, identifying the PS. The CS can then direct the command to the PS using the received identification.

In some embodiments of the invention, the command may be to alert the user of the PS to perform an action. Examples of some actions that the user may be requested to perform include powering the PS down (i.e. turning off the PS), adjusting the ringer volume, and turning off the ringer. The user request may by provided in different ways depending upon the type of PS and its capabilities as well as the importance of the request. The user alert can be provided by sending a command to display a text message, play an audio message and simulate a call, among others.

In such an embodiment, the CS may also wait for some time interval at block 403, determine whether the user has performed the action at block 405, and then send a command to the PS to perform the action at block 407. The amount of time that the CS waits may be selected based on the urgency of the action and the amount of time that might be necessary for a typical user to perform the action. Before commanding the PS to perform the action, the CS may send one or more additional alerts to the user requesting that the user perform the action.

An example of a process flow shown in blocks 403, 405, and 407 is for the CS to send a command to provide a message to the user of the PS to power off the PS. One such message would be to play a flashing text message together with an audible beep. The CS may then wait for a time interval of, for example 2 minutes. It may then send a status request message to the PS to determine whether the PS has been powered down. If the PS responds, it is still turned on. The CS may then send a command to the PS to power down without user intervention.

Figure 5:
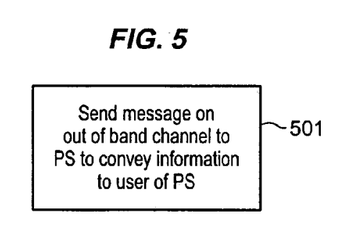
FIG. 5 shows a process for sending messages or instructions to a portable radio device according to one embodiment of the invention.

FIG. 5 shows a process for sending messages or instructions to a PS according to an embodiment of the invention. The CS may send a message on an out of band channel to a PS to convey information to a user of the PS at block 501. The action of block 501 can be performed together with or apart from any of the actions described herein. The message may be a text sequence, a video sequence, and an audio sequence among others.

Figure 6:
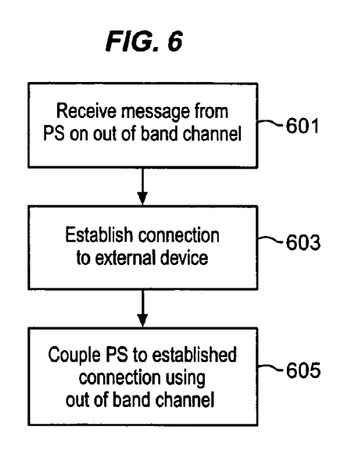
FIG. 6 shows an example of a process for routing calls or sessions according to one embodiment of the present invention.

FIG. 6 shows an example of a process for routing calls or sessions according to the present invention. A message is received at the CS from a PS on an out of band channel at block 601. In one embodiment, the message indicates an identification of the PS, a request to make an external connection, and an identification of the external device to which the PS wishes to connect. In another embodiment, this information is communicated in several messages. This information may also be developed through a two-way communication of several messages between the CS and the PS. The CS establishes a connection to the identified external device at block 603. As mentioned above, the external device may be a terminal on a PSTN, a LAN, a WAN or coupled to the Internet. Any device that can be reached by the CS can be the object of the connection.

The CS couples the PS to the established connection using the out of band channel at block 605. This connection allows the in band channels to be reserved for other purposes. It may also allow a connection to an in band base station when no in band channels are available or within range. The process of FIG. 6 may be used to provide pay telephone or network connection services. It may also be used to allow connectivity to a network to which the PS would not otherwise be able to connect.

Figure 7:
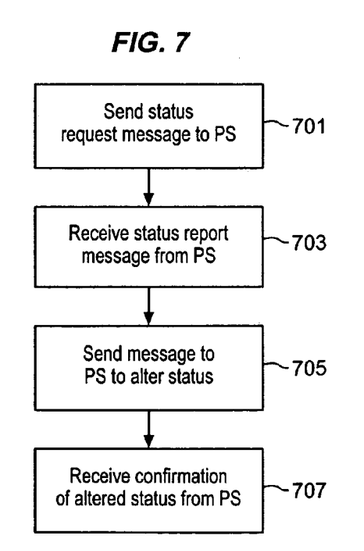
FIG. 7 shows an example of a process for adjusting settings of a portable radio device according to one embodiment of the invention.

FIG. 7 shows an example of a process for adjusting settings of a PS according to an embodiment of the invention. The CS sends a message to the PS requesting a status report for alterable settings of the PS at block 701. The CS receives a reply message from PS reporting the status of the settings at block 703. The settings can include any of the setting described herein, among others. Common setting may include ringer settings, transmitter settings, receiver settings, and power settings. With this reply, the CS may then send a message to the PS to alter the status of at least one of the settings at block 705. The message to alter the status of one or more of the settings may include an indication of a time at which the status of the setting or settings should be altered. The CS may then receive a confirmation from the PS of the message to alter the status of the settings at block 707. The confirmation may acknowledge receipt or acknowledge that the setting has been altered. Alternatively two messages can be sent by the PS, one to acknowledge receipt and the other to acknowledge that the setting or settings have been altered.

Any one or more of the actions shown in FIG. 7 can be skipped to reduce the number of messages. The actions can also be combined with any one or more of the actions described with reference to FIGS. 4, 5, and 6. For example, before sending the message requesting the status report, the CS may send an initial query and receive a message from the PS indicating an identification of the PS. The messages described with respect to FIG. 7 may then be sent using identifications.

The CPC commands may be structured in a variety of different ways depending on the particular application. The particular command structure may be developed to accommodate different command sets, different needs for reliability or robustness in communications and to adapt for use with different existing or later developed communications protocols. A command structure is provided below as an example structure that may accomplish many or all of the functions described. This structure may be used for a unique communications protocol, system and modulation format or it may be inserted as a data message inside of another communications protocol such as IEEE 802.11, GPRS, or Bluetooth.

For the purposes of the current example of commands, components or elements of the commands may be defined as follows:

CPC Header: This portion of the message identifies the command as belonging to the set of CPC commands. All CPC commands listed below have this section.

Message Status: This portion of the message holds the message length and retry count.

Station ID: Each command station may be assigned an ID (identification). When a station, both a PS and a CS, transmits a message, it may include this ID. The ID may be used by the PS to identify messages from the CPC with which it is trying to communicate. It may also be used in messages sent by the PS to allow the CPC to identify messages that are addressed to it. That way, if the transmissions from two or more stations overlap or interfere, the transmissions may be distinguished. Similarly, a message intended for another station may be disregarded.

ESN (Electronic Serial Number): All CPC devices may have a unique serial number. In the case of cell phones, this may be the same as the electronic serial number the cell phone uses to identify itself to its cell phone base stations. The ESN may be used like the station ID to identify the portable radio device in the same way that the station ID may be used to identify the command station.

Command #: This is a number to uniquely identify each command.

Data Field: This portion of the message has additional data relevant to the message which contains it.

Delay Time: This portion of the message indicates how much time (in e.g. milliseconds) should be allowed to pass before the command is executed. This may also be given as an absolute time and date for the command to be executed. Delay times may be abortable or non-abortable.

CRC: This is a Cyclical Redundancy Check or checksum to verify the accuracy of the received message.

Using the fields described above, a variety of different commands may be transmitted and received. A few such examples are described below. However, many other commands are possible. In this embodiment, the commands are configured so that the messages being sent from a PS contain the station ID followed by the ESN. Messages sent from a CS contain the ESN followed by the station ID for which the message is intended. This allows the messages to be distinguished and also supports the different functions for the messages. Each message below is described using a title, a source (an identification whether it is a message to be sent by the CS or the PS), a format (a data structure using the fields described above), and a short description. Any of these messages may be modified to suit a particular application.

Title: Initial Query

Source: CS

Format: CPC Header, Message Status, CS ID, Command #, CRC

Description: The CS may periodically send out this message. PS's within range, which are not already in a session with this, another CS, or another communication station, may be motivated into a session with the transmitting CS. In some embodiments, a PS may maintain sessions with more than one CS at a time or with a CS and another radio station simultaneously.

Title: Initial Reply

Source: PS

Format: CPC Header, Message Status, ESN, CS ID, Command #, Data Field, CRC

Description: A PS which receives an Initial Query may respond with this message. The data field may contain data to indicate what capabilities the PS has (e.g. text display, audible alert (ring), voice, etc.).

Title: Setting Query

Source: CS

Format: CPC Header, Message Status, CS ID, ESN, Command #, Data Field, CRC

Description: The CS instructs the PS to report the value for a setting that can be altered via CPC commands (e.g. currently displayed text, ringer volume, etc.). The data field may contain an indication of which setting is to be reported.

Title: Setting Report

Source: PS

Format: CPC Header, Message Status, ESN, CS ID, Command #, Data Field, CRC

Description: A PS uses this message to report the current value of a setting that can be altered via CPC commands. The data field indicates which setting is being reported and the current value. The PS can, for instance, use this to report that a button has been pressed.

Title: Delayed Command Acknowledgement

Source: PS

Format: CPC Header, Message Status, ESN, CS ID, Command #, Data Field, CRC

Description: A PS that receives a command with a delay field not equal to zero may reply with this message immediately (without waiting for the delay to expire). The data field may contain the command number from the message that contained the non-zero delay field.

Title: Setting Assignment
Source: CS
Format: CPC Header, Message Status, CS ID, ESN, Command #, Delay Time, Data Field, CRC
Description: The CS instructs the PS to alter (or confirm) a specific setting to match the values given in the data field. If the delay time is zero, the PS may execute the command and send a Setting Report. If the delay time is not zero, the PS may immediately reply with a Delayed Command Acknowledgement. When the delay time has expired, the new value may be assigned and the PS may send a Setting Report.

Title: CS Data Block
Source: CS
Format: CPC Header, Message Status, CS ID, ESN, Command #, Data Field, CRC
Description: The CS uses this message to transfer data to the PS. This data may be voice, picture, video, data files, or other information.

Title: Acknowledge CS Data Block
Source: PS
Format: CPC Header, Message Status, ESN, CS ID, Command #, CRC
Description: The PS uses this message to indicate that the last CS Data Block was received.

Title: Device Data Block
Source: PS
Format: CPC Header, Message Status, ESN, CS ID, Command #, Data Field, CRC
Description: The PS uses this message to transfer data to the CS. This data may be voice, picture, video, data files, or other information.

Title: Acknowledge Device Data Block
Source: CS
Format: CPC Header, Message Status, CS ID, ESN, Command #, CRC
Description: The CS uses this message to indicate that the last Device Data Block was received.

In the example above, CPC commands are used to alter a particular setting or to determine the value of a particular setting. Many of the functions described above in the context of FIGS. 1, 2 and 3 may be accomplished using a setting as described for the CPC commands above. The choice of settings to affect, set, or check may be varied to suit any particular application. Some of the settings may include any one or more of the following: ringer volume; ringer type, ringer mode, display mode, system power status, CPC band transmitter power or status, primary band transmitter power or status, receiver power or status, LED status, "Green" mode status, etc.

In addition, the command messages may be used to transmit different types of data, including: display text, display audio, display video, Internet data, telephone session data (voice and audio), ringer types and patterns, interactive game inputs, outputs and programs, etc.

It is to be appreciated that a lesser or more fully equipped CS and PS than the examples described above may be preferred for certain implementations. Therefore, the configuration of the CS and PS will vary from implementation to implementation depending upon numerous factors, such as price constraints, performance requirements, technological improvements, or other circumstances. Embodiments of the invention may also be applied to other types of software-driven systems that use different hardware architectures than that shown in FIGS. 1 and 2.

In the description above, for purposes of explanation, numerous specific details are set forth in order to provide a thorough understanding of the present invention. It will be apparent, however, to one skilled in the art, that the present invention may be practiced without some of these specific details. In other instances, well-known structures and devices are shown in block diagram form.

The present invention may include various steps. The steps of the present invention may be performed by hardware components, such as those shown in FIGS. 1 and 2, or may be embodied in machine-executable instructions, which may be used to cause general-purpose or special-purpose processor or logic circuits programmed with the instructions to perform the steps. Alternatively, the steps may be performed by a combination of hardware and software.

The present invention may be provided as a computer program product which may include a machine-readable medium having stored thereon instructions which may be used to program a media center (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods and apparatus are described in their most basic form but steps may be added to or deleted from any of the methods and components may be added or subtracted from any of the described apparatus without departing from the basic scope of the present invention. It will be apparent to those skilled in the art that many further modifications and adaptations may be made. The particular embodiments are not provided to limit the invention but to illustrate it. The scope of the present invention is not to be determined by the specific examples provided above but only by the claims below.

What is claimed is:

1. A method comprising:
   detecting the presence of a portable radio device within range of a radio frequency communications link; and
   sending a message to the portable radio device using the radio frequency communications link to cause the portable radio device to instruct a user of the portable radio device to change an internal setting of the portable radio device;
   waiting for a time interval; and
   determining whether the user has changed the internal setting; and
   sending a second message to the portable radio device using the radio frequency communications link to change an internal setting of the portable radio device if the user has not changed the internal setting.

2. The method of claim 1, wherein the internal setting comprises at least one of a text message, an audio message, a video message, power down, ringer off, and ringer volume adjust.

3. The method of claim 1, wherein detecting comprises:
   broadcasting a query command using the radio communications link; and
   receiving an identification message from the portable radio device over the radio communications link; and
   wherein sending comprises sending the command including the identification.

4. The method of claim 3, wherein receiving an identification message comprises receiving a capabilities and status report from the portable radio device and wherein sending the first message comprises sending a message based on the capabilities and status report.

5. The method of claim 4, wherein sending the first message comprises sending a video message if the status report indicates that the portable radio device is not in a call.

6. The method of claim 4, wherein sending the first message comprises sending an audio message if the status report indicates that the portable radio device is in a call.

7. The method of claim 1,
wherein sending the second message comprises sending a command to change the user setting independent of the user.

8. The method of claim 7, wherein the internal setting comprises a power on/off setting, wherein determining comprises determining whether the portable radio device power has been set to off, and wherein sending the command comprises sending a command to the portable radio device to power down.

9. The method of claim 1, wherein sending a message comprises at least one of sending a text message, sending an audio message, and simulating a call.

10. The method of claim 1, wherein the radio frequency communications link is an out of band channel.

11. The method of claim 1, further comprising establishing a connection with an external device over the radio frequency communications link.

12. The method of claim 11, wherein the external device is a public switched telephone network.

13. The method of claim 11, wherein the external device is a base station for in band communications.

14. The method of claim 13, wherein establishing a connection comprises establishing a connection to a remote radio transceiver in communication with the base station.

15. The method of claim 1, wherein the first message is to simulate a telephone call to the user with a voice message to instruct the user to change the internal setting.

16. The method of claim 1, wherein determining whether the user has changed the internal setting comprises sending a status query to the portable radio device.

17. A machine-readable medium having stored thereon data representing instructions which, when executed by a machine, cause the machine to perform operations comprising:
sending a message to the portable radio device using the radio frequency communications link to cause the portable radio device to instruct a user of the portable radio device to change an internal setting of the portable radio device;
waiting for a time interval; and
determining whether the user has changed the internal setting; and
sending a second message to the portable radio device using the radio frequency communications link to change an internal setting of the portable radio device if the user has not changed the internal setting.

18. The medium of claim 17, wherein the internal setting comprises at least one of a text message, an audio message, a video message, power down, ringer off, and ringer volume adjust.

19. The medium of claim 17, wherein the instructions for detecting comprise instructions which, when executed by the machine, cause the machine to perform further operations comprising:
broadcasting a query command using the radio communications link; and
receiving an identification message from the portable radio device over the radio communications link; and
wherein sending comprises sending the command including the identification.

20. The medium of claim 19, wherein the instructions for receiving an identification message comprise instructions which, when executed by the machine, cause the machine to perform further operations comprising receiving a capabilities and status report from the portable radio device and wherein the instructions for sending the first message comprise instructions which, when executed by the machine, cause the machine to perform further operations comprising sending a message based on the capabilities and status report.

21. The medium of claim 20, wherein the instructions for sending the first message comprise instructions which, when executed by the machine, cause the machine to perform further operations comprising sending a video message if the status report indicates that the portable radio device is not in a call.

22. The medium of claim 20, wherein the instructions for sending the first message comprise instructions which, when executed by the machine, cause the machine to perform further operations comprising sending an audio message if the status report indicates that the portable radio device is in a call.

23. The medium of claim 17, further comprising instructions which, when executed by the machine, cause the machine to perform further operations comprising:
wherein sending the second message comprises sending a command to change the user setting independent of the user.

24. The medium of claim 23, wherein the internal setting comprises a power on/off setting, wherein the instructions for determining comprise instructions which, when executed by the machine, cause the machine to perform further operations comprising determining whether the portable radio device power has been set to off, and wherein the instructions for sending the command comprise instructions which, when executed by the machine, cause the machine to perform further operations comprising sending a command to the portable radio device to power down.

25. The medium of claim 17, wherein the instructions for sending a message comprise instructions which, when executed by the machine, cause the machine to perform further operations comprising at least one of sending a text message, sending an audio message, and simulating a call.

26. The medium of claim 17, wherein the radio frequency communications link is an out of band channel.

27. The medium of claim 17, further comprising instructions which, when executed by the machine, cause the machine to perform further operations comprising establishing a connection with an external device over the radio frequency communications link.

28. The medium of claim 27, wherein the external device is a public switched telephone network.

29. The medium of claim 27, wherein the external device is a base station for in band communications.

30. The medium of claim 29, wherein the instructions for establishing a connection comprise instructions which, when executed by the machine, cause the machine to perform further operations comprising establishing a connection to a remote radio transceiver in communication with the base station.

31. The medium of claim 17, wherein the first message is to simulate a telephone call to the user with a voice message to instruct the user to change the internal setting.

32. The medium of claim 17, wherein the instructions for determining whether the user has changed the internal setting comprise instructions which, when executed by the machine, cause the machine to perform further operations comprising sending a status query to the portable radio device.

33. A control station comprising:
a transceiver to establish a radio frequency communications link;
a memory to store commands for changing an internal setting of a portable radio device; and
a processor coupled to the memory to cause the presence of a portable radio device within range of the radio frequency communications link to be detected, to cause a message to be sent to the portable radio device using the radio frequency communications link to cause the portable radio device to instruct a user of the portable radio device to change an internal setting of the portable radio device, to wait for a time interval, to determine whether the user has changed the internal setting, and to cause a second message to be sent to the detected portable radio device using the radio frequency communications link to change an internal setting of the portable radio device if the user has not changed the internal setting.

34. The station of claim 33, wherein the internal setting comprises at least one of a text message, an audio message, a video message, power down, ringer off, and ringer volume adjust.

35. The station of claim 33, wherein the detecting is accomplished by:
broadcasting a query command using the radio communications link; and
receiving an identification message from the portable radio device over the radio communications link; and
wherein the command is sent with the received identification.

36. The station of claim 35, wherein receiving an identification message comprises receiving a capabilities and status report from the portable radio device and wherein sending the first message comprises sending a message based on the capabilities and status report.

37. The station of claim 36, wherein sending the first message comprises sending a video message if the status report indicates that the portable radio device is not in a call.

38. The station of claim 36, wherein sending the first message comprises sending an audio message if the status report indicates that the portable radio device is in a call.

39. The station of claim 33, wherein the message comprises at least one of a text message, an audio message, and a simulated call.

40. The station of claim 33, wherein the radio frequency communications link is an out of band channel.

41. The station of claim 33, further comprising:
an external communications interface to establish a connection to an identified external device; and
a bus to couple data between the transceiver and the external communications interface,
wherein the processor is further to establish a connection with the external device through the external communications interface and to couple the portable radio device to the established connection over the radio frequency communications link.

42. The station of claim 41, wherein the external device is a public switched telephone network and the external communications interface is a telephony modem.

43. The station of claim 41, wherein the external device is a base station for in band communications and the external communications interface communicates with the base station using in band communications.

44. The station of claim 43, wherein establishing a connection comprises establishing a connection to a remote radio transceiver in communication with the base station.

45. The station of claim 33, wherein the first message is to simulate a telephone call to the user with a voice message to instruct the user to change the internal setting.

46. The station of claim 33, wherein determining whether the user has changed the internal setting comprises sending a status query to the portable radio device.

47. A control station comprising:
an antenna;
a transceiver coupled to the antenna to establish a radio frequency communications link through the antenna;
a memory to store commands for changing an internal setting of a portable radio device; and
a processor coupled to the memory to cause the presence of a portable radio device within range of the radio frequency communications link to be detected, to cause a message to be sent to the portable radio device using the radio frequency communications link to cause the portable radio device to instruct a user of the portable radio device to change an internal setting of the portable radio device, to wait for a time interval, to determine whether the user has changed the internal setting, and to cause a second message to be sent to the detected portable radio device using the radio frequency communications link to change an internal setting of the portable radio device if the user has not changed the internal setting.

48. The station of claim 47, wherein the internal setting comprises at least one of a text message, an audio message, a video message, power down, ringer off, and ringer volume adjust.

49. The station of claim 47, wherein the detecting is accomplished by:
broadcasting a query command using the radio communications link; and
receiving an identification message from the portable radio device over the radio communications link; and
wherein the command is sent with the received identification.

50. The station of claim 49, wherein receiving an identification message comprises receiving a capabilities and status report from the portable radio device and wherein sending the first message comprises sending a message based on the capabilities and status report.

51. The station of claim 50, wherein sending the first message comprises sending a video message if the status report indicates that the portable radio device is not in a call.

52. The station of claim 50, wherein sending the first message comprises sending an audio message if the status report indicates that the portable radio device is in a call.

53. The station of claim 47, wherein the message comprises at least one of a text message, an audio message, and a simulated call.

54. The station of claim 33, wherein the radio frequency communications link is an out of band channel.

55. The station of claim 47, further comprising:
an external communications interface to establish a connection to an identified external device; and a bus to couple data between the transceiver and the external communications interface, wherein the processor is further to establish a connection with the external device through the external communications interface and to couple the portable radio device to the established connection over the radio frequency communications link.

56. The station of claim 55, wherein the external device is a public switched telephone network and the external communications interface is a telephony modem.

57. The station of claim 55, wherein the external device is a base station for in band communications and the external communications interface communicates with the base station using in band communications.

58. The station of claim 57, wherein establishing a connection comprises establishing a connection to a remote radio transceiver in communication with the base station.

59. The station of claim 47, wherein the first message is to simulate a telephone call to the user with a voice message to instruct the user to change the internal setting.

60. The station of claim 47, wherein determining whether the user has changed the internal setting comprises sending a status query to the portable radio device.

61. A method comprising:
    detecting the presence of a control station within range of a radio frequency communications link;
    receiving a message from the control station using the radio frequency communications link to instruct a user to change the internal setting;
    waiting for a time interval; and
    determining whether the user has changed the internal setting; and
    receiving a second message from the control station using the radio frequency communications link to change an internal setting if the user has not changed the internal setting.

62. The method of claim 61, wherein the internal setting comprises at least one of a text message, an audio message, a video message, power down, ringer off, and ringer volume adjust.

63. The method of claim 61, wherein detecting comprises:
    receiving a broadcast query command from the control station over the radio communications link; and
    sending an identification message to the control station over the radio communications link; and
    wherein receiving comprises receiving the command including the identification.

64. The method of claim 63, wherein sending an identification message comprises sending a capabilities and status report and wherein receiving the first message comprises receiving a message based on the capabilities and status report.

65. The method of claim 64, further comprising displaying a video message based on the first message if the status report indicates that the user is not in a call.

66. The method of claim 64, further comprising playing an audio message based on the first message if the status report indicates that the user is in a call.

67. The method of claim 61, wherein the second message comprises a command, the method further comprising:
    executing the command.

68. The method of claim 67, wherein the internal setting comprises a power on/off setting, wherein determining comprises determining whether the power has been set to off, and wherein receiving the command comprises receiving a command to power down.

69. The method of claim 67, wherein receiving a message comprises at least one of receiving a text message, receiving an audio message, and simulating a call.

70. The method of claim 61, wherein the radio frequency communications link is an out of band channel.

71. The method of claim 61, further comprising:
    sending a message to the control station on an out of band channel, the message indicating an identification, a request to make an external connection, and an identification of an external device with which to connect;
    receiving a message that a connection to the identified external device has been established; and
    coupling to the external device using an out of band channel to the control station and the established connection.

72. The method of claim 71, wherein the external device is a public switched telephone network.

73. The method of claim 71, wherein the external device is a base station for in band communications.

74. The method of claim 73, wherein the connection to the identified external device comprises a connection to a remote radio transceiver in communication with the base station.

75. The method of claim 61, further comprising simulating a telephone call to the user with a voice message to instruct the user to change the internal setting based on the first message.

76. A machine-readable medium having stored thereon data representing instructions which, when executed by a machine, cause the machine to perform operations comprising:
    detecting the presence of a control station within range of a radio frequency communications link;
    receiving a message from the control station using the radio frequency communications link to instruct a user to change the internal setting;
    waiting for a time interval; and
    determining whether the user has changed the internal setting; and
    receiving a second message from the control station using the radio frequency communications link to change an internal setting if the user has not changed the internal setting.

77. The medium of claim 76, wherein the internal setting comprises at least one of a text message, an audio message, a video message, power down, ringer off, and ringer volume adjust.

78. The medium of claim 76, wherein the instructions for detecting comprise instructions which, when executed by the machine, cause the machine to perform further operations comprising:
    receiving a broadcast query command from the control station over the radio communications link; and
    sending an identification message to the control station over the radio communications link; and
    wherein the instructions for receiving comprise instructions which, when executed by the machine, cause the machine to perform further operations comprising receiving the command including the identification.

79. The method of claim 78, wherein sending an identification message comprises sending a capabilities and status report and wherein receiving the first message comprises receiving a message based on the capabilities and status report.

80. The method of claim 79, further comprising displaying a video message based on the first message if the status report indicates that the user is not in a call.

81. The method of claim 79, further comprising playing an audio message based on the first message if the status report indicates that the user is in a call.

82. The medium of claim 76, wherein the second message comprises a command, the medium further comprising instructions which, when executed by the machine, cause the machine to perform further operations comprising
executing the command.

83. The medium of claim 76, wherein the message comprises at least one of a text message, an audio message, and simulating a call.

84. The method of claim 76, further comprising simulating a telephone call to the user with a voice message to instruct the user to change the internal setting based on the first message.

85. A portable radio device comprising:
a transceiver to establish a radio frequency communications link with a control station and to receive commands over the radio frequency communication link from the control station;
a memory to store the commands; and
a processor coupled to the memory to cause a user to be instructed to change an internal setting of the control station based on a first command, to wait for a time interval, to determine whether the user has changed the internal setting, and if the user has not changed the internal setting, to cause the internal setting to be changed upon receiving a second command over the radio frequency communications link from the control station to change the internal setting.

86. The device of claim 85, wherein the internal setting comprises at least one of a text message, an audio message, a video message, power down, ringer off, and ringer volume adjust.

87. The device of claim 85, wherein the processor further causes the mobile radio station to register with a control station by:
receiving a query command from the control station through the transceiver; and
sending an identification message to the control station; and
wherein the received command includes the sent identification.

88. The device of claim 85, wherein the received command comprises at least one of a text message, an audio message, and a simulated call.

89. A portable radio device comprising:
an antenna;
a transceiver coupled to the antenna to establish a radio frequency communications link through the antenna with a control station and to receive commands over the radio frequency communication link from the control station;
a memory to store the commands; and
a processor coupled to the memory to cause a user to be instructed to change an internal setting of the control station based on a first command, to wait for a time interval, to determine whether the user has changed the internal setting, and if the user has not changed the internal setting, to cause the internal setting to be changed upon receiving a second command over the radio frequency communications link from the control station to change the internal setting.

90. The device of claim 89, wherein the internal setting comprises at least one of a text message, an audio message, a video message, power down, ringer off, and ringer volume adjust.

91. The device of claim 89, wherein the processor further causes the mobile radio station to register with a control station by:
receiving a query command from the control station through the transceiver; and
sending an identification message to the control station; and
wherein the received command includes the sent identification.

92. The device of claim 89, wherein the received command comprises at least one of a text message, an audio message, and a simulated call.

* * * * *